March 8, 1932. R. MÜLLER ET AL 1,848,740
RECOVERY OF PURINE BASES
Filed Jan. 3, 1930
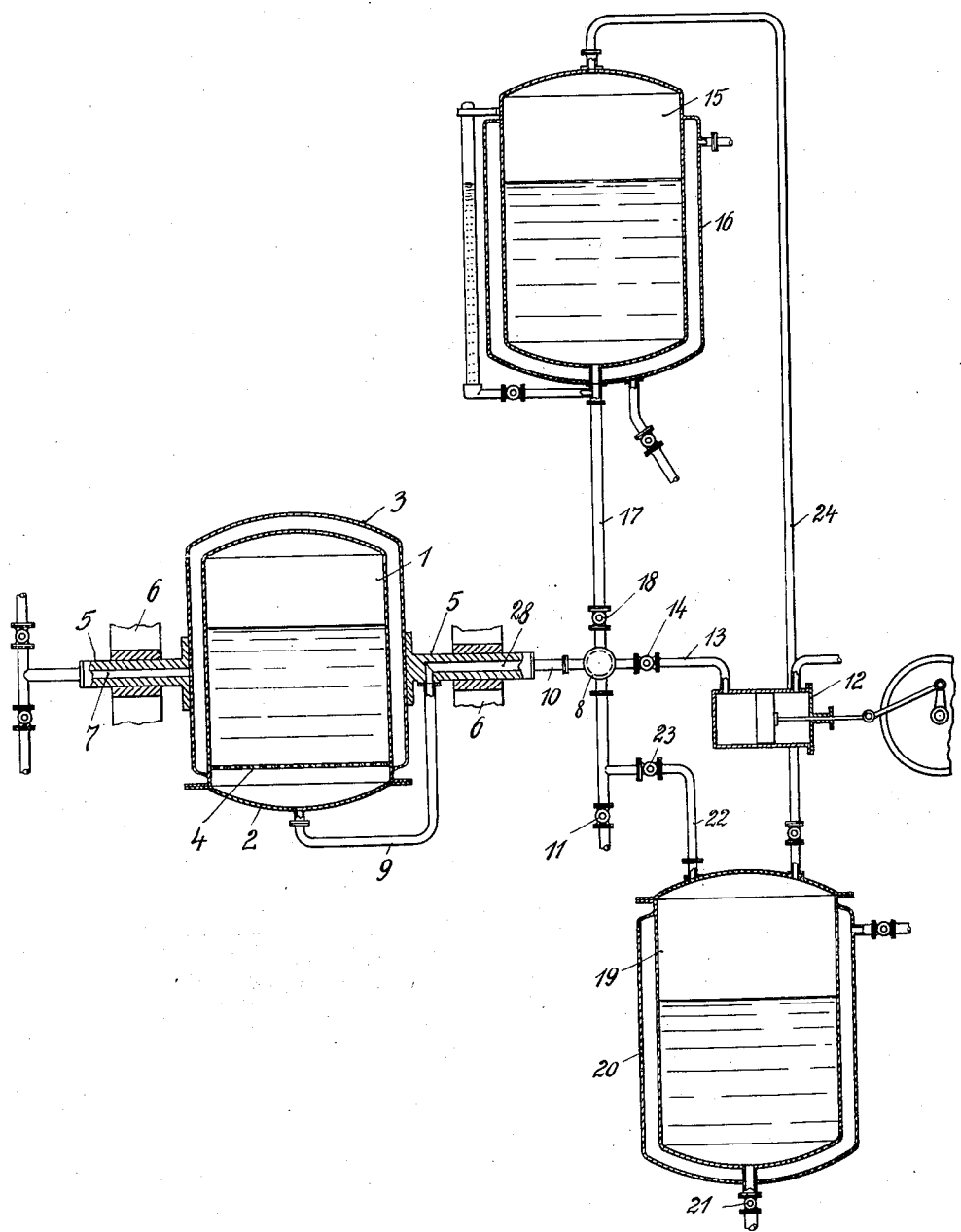
Inventor:
Richard Müller and Lorenz Holzer
by Kleinhans
Atty.

Patented Mar. 8, 1932

1,848,740

UNITED STATES PATENT OFFICE

RICHARD MÜLLER, OF MANNHEIM, AND LORENZ HOLZER, OF MANNHEIM-WALDHOF, GERMANY, ASSIGNORS TO THE FIRM C. F. BOEHRINGER & SOEHNE G. M. B. H., OF MANNHEIM-WALDHOF, GERMANY

RECOVERY OF PURINE BASES

Application filed January 3, 1930, Serial No. 418,310, and in Germany March 3, 1928.

The present invention refers to a treatment of natural products which contain alkaloids of the purine group and more especially theobromine, caffeine and theophylline with a view to recovering these bases together with byproducts such as fats and the like.

It is an object of the present invention to provide means for recovering the alkaloids and byproducts in a simpler and more efficient manner than has hitherto been possible.

In accordance with this invention natural products containing purine bases, for instance cocoa, cocoa husks or tea dust are treated with liquid sulfurous acid as an extraction or lixiviation agent and the purine bases and byproducts are recovered from the extract.

Depending upon the quality and constitution of the starting material and the quality of the bases and byproducts to be recovered and considering the desired degree of exhaustion of the starting material, extraction is carried out either in the cold or preferably at a more or less elevated temperature, in other words, at ordinary or increased pressure. The action of the sulfurous acid can be enhanced by treatment, either beforehand or simultaneously, of the starting material with some other suitable agent, for instance a dilute acid or alkaline solution. Any dilute non-neutral solution is suitable, that is, one which is either slightly acid or slightly alkaline in reaction.

In practising this invention, we may for instance proceed as follows, availing ourselves of an apparatus such as illustrated diagrammatically by way of example in the drawings affixed to this specification and forming part thereof.

Referring to the drawings, 1 is an autoclave, 2 is a cover for closing the same, 3 is a jacket for introducing a heating or cooling medium, 4 is a filter bottom and 5 are journals supported in bearings 6 in which the autoclave can be rotated. The heating or cooling medium may be introduced into the jacket 3 through a boring 7 in one of the journals, while a boring 28 in the other journal is connected by a pipe 9 with the interior of the autoclave and by a pipe 10 with a sample glass, 11 being a tap-cock permitting the taking of samples. 12 is an evacuating pump, 13 is a pipe connecting said pump with the show glass 8 and 14 is a valve inserted in said pipe. 15 is a measuring vessel, 16 is a cooling jacket surrounding said vessel, 17 is a pipe connecting the interior of the vessel with the show glass 8, 18 is a valve inserted in pipe 17. 19 is a container provided with a heating jacket 20 and a tap-cock 21, 22 is a pipe connecting the interior of the container 19 with the show glass 8 and 23 is a valve inserted in said pipe, 24 is a pipe connecting the interior of the container 19 with the measuring vessel 15.

20 kgs. cocoa containing 2.26% theobromine, 0.2% caffeine and 17.24% fat are placed in the extraction apparatus 1 which is then closed and evacuated by means of pump 12. Now 60 liters liquid sulfurous acid are allowed to flow from the measuring vessel 15 through pipe 17 into the extraction apparatus 1. The extraction apparatus is now heated to a temperature above the melting point of the fat (about 45° C.) by means of steam introduced into the jacket 3 and the apparatus is then kept rotating for about 30 minutes. During this time the pressure in the apparatus will rise to about 6-7 atms. The extract formed in the apparatus is then allowed to flow into the container 19, which has previously been cooled and evacuated. Samples may be taken from the show glass 8.

In the first extract thus obtained about 65% of the theobromine and the caffeine contained in the starting material will be recovered, while only about 1.5-2% of the fat will have dissolved in the liquid sulfurous acid, the undissolved molten fat passing for the greater part through the filter bottom 4 as a liquid layer supernatant the sulfurous acid. Steam or hot water is now admitted into the jacket 20 surrounding the container 19 and the sulfurous acid is distilled over through pipe 24 into the measuring vessel 15, which has previously been cooled, while the theobromine, caffeine and fat and the water from the cocoa can be tapped off at 21.

In the meantime the extraction apparatus 1 has been cooled by admitting water into the jacket 3 and 60 liters liquid sulfurous acid are admitted again into this apparatus from the measuring vessel 15. Extraction is now proceeded with anew at a temperature of about 105° C. under a pressure of about 30 atms. and after about 15 minutes' extraction the contents of the autoclave are treated as above described.

In a similar manner three more extracts are obtained. The first extract is produced at comparatively low temperature as above described in order to prevent decomposition of the fat. If no valuable fatty matter worth recovering is present in the starting material, this first extraction may also be carried through at higher temperatures.

At the end of the last extraction procedure, after all the sulfurous acid has been removed, a residue remains in the extraction apparatus 1 which is practically free from fatty matter and which still contains about 25.4 grams theobromine and caffeine, this corresponding to about 95% extraction of the alkaloids.

If the process is carried through at a lower temperature, for instance at room temperature, the unextracted percentage of alkaloids in the starting material, if five extraction operations have been carried through, will be about 15–20%.

The alkaloids (theobromine, caffeine or theophylline), the fatty matter and the water, which may be present, are separated from each other in a well known manner. The fat can be separated from the water, etc., by simple decantation. The water can be removed by evaporation at this stage or the alkaloids can be extracted therefrom by an organic solvent such as chloroform. The alkaloids can be separated from each other by differential solution in benzene, for example, as suggested by Ernst Schmidt in Annallen der Chemie 217,308 (1883) where it is stated (translating):

"In the quantitative determination of theobromine in cocoa (see my Textbook of Pharmaceutical Chemistry, Vol. 2, p. 1064) any caffeine present would be weighed as theobromine. In order to eventually separate these two bases from each other, which would scarcely be required in the practice of the foodstuff chemist, the difference in solubility of the bases in cold benzene can probably be used with advantage."

In the reference to his Textbook of Pharmaceutical Chemistry Schmidt describes the extraction of caffeine from cocoa with chloroform, in which both caffeine and theobromine are said to be soluble.

If treating tea dust, which contains about 2.7% caffeine, this caffeine and small quantities of theophylline are recovered practically quantitatively by extracting four times with sulfurous acid at about 30 atms. pressure.

If cocoa husks are treated instead of cocoa these husks must be ground very finely and in this and other cases it may be useful to first decompose the starting material with a dilute solution of an alkaline compound or a dilute acid or with some other suitable agent before extracting with sulfurous acid.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. In the recovery of alkaloids of the purine group from natural vegetable matter containing the same, the process which comprises extracting said matter with liquid sulfurous acid, distilling the liquid sulfurous acid from said extract, repeating the extraction with the acid recovered in the distillation step and recovering alkaloids from the resulting extract.

2. In the recovery of alkaloids of the purine group from natural vegetable matter containing the same, the process which comprises extracting said matter with liquid sulfurous acid, distilling the liquid sulfurous acid from said extract and recovering the said alkaloids and fatty matter from the resulting residues.

3. In the recovery of alkaloids of the purine group from natural vegetable matter containing the same, the process which comprises treating said matter with a dilute non-neutral solution and subsequently extracting the said alkaloids with liquid sulfurous acid.

4. In the recovery of alkaloids of the purine group from natural vegetable matter containing the same, the process which comprises treating said matter with a dilute acid solution and thereafter extracting said alkaloids with liquid sulfurous acid.

5. In the recovery of alkaloids of the purine group from natural vegetable matter containing the same, the process which comprises treating said matter with liquid sulfurous acid and repeating the extraction at progressively increasing temperatures and pressures and thereafter recovering alkaloids from the resulting extract.

6. In the recovery of alkaloids of the purine group from natural vegetable matter containing the same, the process which comprises treating said matter with liquid sulfurous acid at temperatures above the melting point but below the decomposition point of the fats contained therein and thereafter recovering alkaloids from the resulting extract.

7. In the recovery of alkaloids of the purine group from natural vegetable matter containing the same, the process which comprises treating said matter with liquid sulfurous acid at temperatures in the neighborhood of 45° C. and thereafter recovering alkaloids from the resulting extract.

8. In the recovery of alkaloids of the purine group from natural vegetable matter containing the same, the process which comprises treating said matter with liquid sulfurous acid at temperatures in the neighborhood of 45° C., drawing off the liquid extract, again treating said matter with liquid sulfurous acid at progressively increasing temperatures up to a maximum of about 105° C. and thereafter recovering alkaloids from the resulting extract.

9. In the recovery of theobromine and caffeine from cocoa, cocoa husks, tea dust and like vegetable matter containing the same, the process which comprises lixiviating said matter with liquid sulfurous acid and recovering theobromine and caffeine from the resulting extract.

In testimony whereof we affix our signatures.

RICHARD MÜLLER.
LORENZ HOLZER.